July 13, 1943.    G. T. MUSKOVIN ET AL    2,324,266
GRINDING MACHINE
Filed Nov. 12, 1941    3 Sheets-Sheet 1
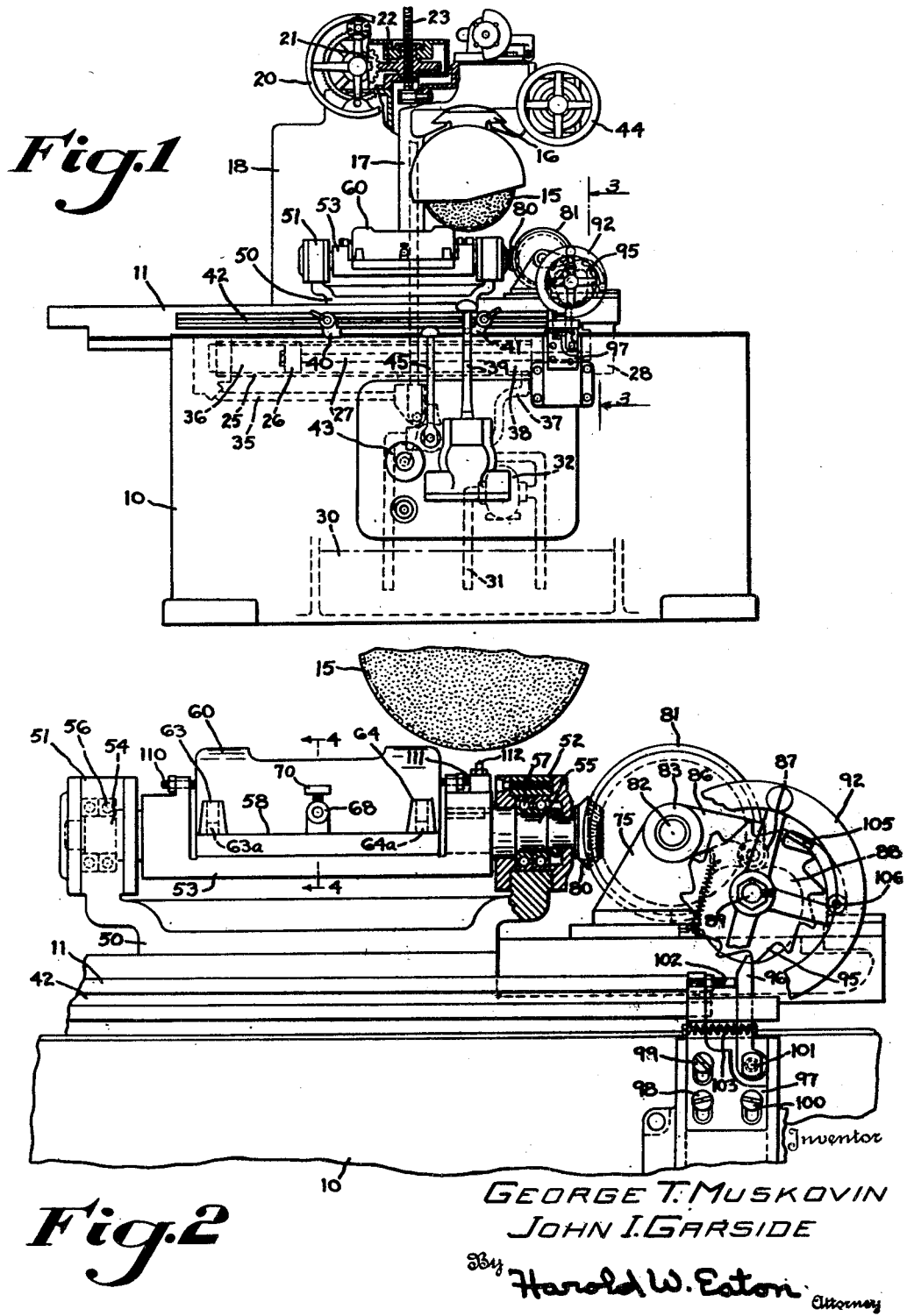

July 13, 1943.  G. T. MUSKOVIN ET AL  2,324,266
GRINDING MACHINE
Filed Nov. 12, 1941   3 Sheets-Sheet 2

Inventor
GEORGE T. MUSKOVIN
JOHN I. GARSIDE
By Harold W. Eaton
Attorney

July 13, 1943. G. T. MUSKOVIN ET AL 2,324,266
GRINDING MACHINE
Filed Nov. 12, 1941 3 Sheets-Sheet 3

Inventor
GEORGE T MUSKOVIN
JOHN I. GARSIDE
By Harold W. Eaton
Attorney

Patented July 13, 1943

2,324,266

UNITED STATES PATENT OFFICE 2,324,266

GRINDING MACHINE

George T. Muskovin, Worcester, and John I. Garside, West Boylston, Mass., assignors to Norton Company, Worcester, Mass., a corporation of Massachusetts Application November 12, 1941, Serial No. 418,766

6 Claims. (Cl. 51—92)

The invention relates to grinding machines, and more particularly to a grinding machine for producing a partial cylindrical surface.

One object of the invention is to provide a simple and thoroughly practical grinding machine for producing a partial cylindrical surface. Another object of the invention is to provide a work supporting and indexing mechanism for grinding a partial cylindrical surface on a work piece. A further object of the invention is to provide an oscillatable work supporting apparatus in which the work support is automatically indexed by and in timed relation with the work reciprocating movement rotarily to index the work piece after each reciprocation thereof. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of this invention, Fig. 1 is a front elevation of a grinding machine embodying the invention;

Fig. 2 is a fragmentary front elevation, on an enlarged scale, of the work supporting and indexing mechanism, having parts broken away and other parts shown in section to more clearly illustrate the structure thereof;

Figure 3:
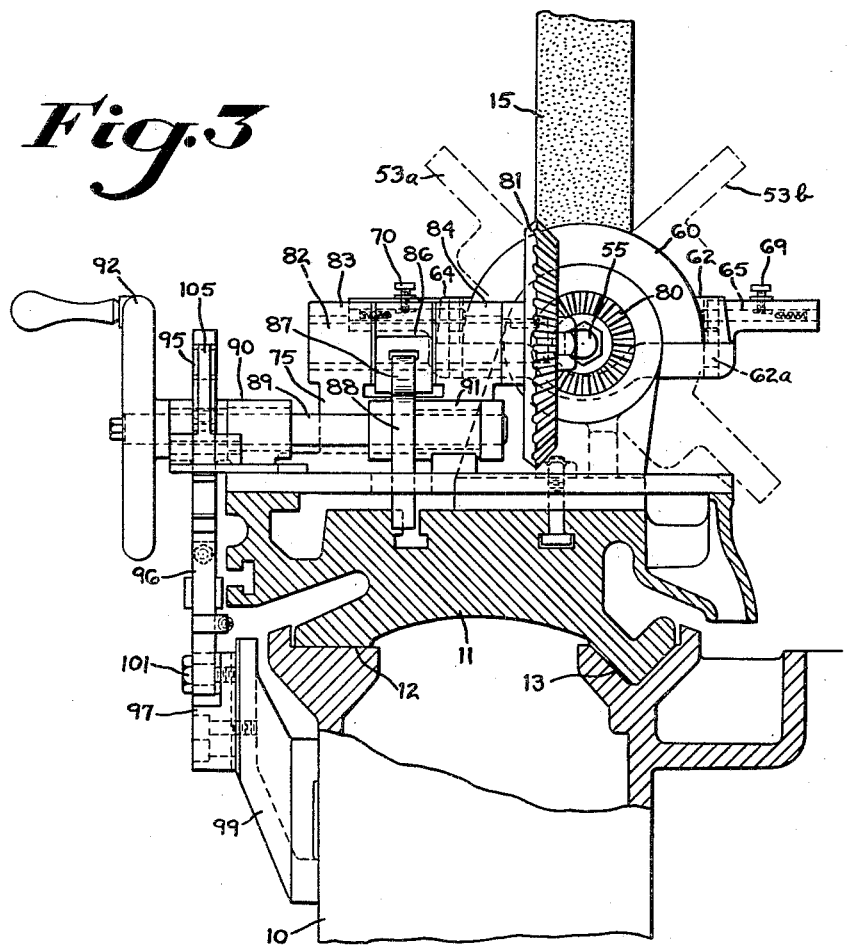
Fig. 3 is a fragmentary sectional view, taken approximately on the line 3—3 of Fig. 1, showing the work supporting and indexing mechanism in end elevation.

A grinding machine has been illustrated in the drawings comprising a base 10 having a longitudinally movable work table 11 supported on a flat way 12 and a V-way 13 on the base 10. A grinding wheel 15 is rotatably supported on a transversely movable wheel slide 16 which is supported on a vertically movable slide 17 carried on an upwardly extending column 18 of the base 10. The vertically movable slide 17 is arranged for a manual adjustment to position the periphery of the grinding wheel 15 relative to the surface of the work piece which is mounted on the table 11 in a manner to be hereinafter described so as to grind a surface thereon to the required extent.

This mechanism may comprise a manually operable feed wheel 20 which is preferably of a type similar to the well-known feeding mechanism, such as shown in the expired U. S. patent to Norton, No. 1,108,779 dated Aug. 25, 1914. The manually operable feed wheel 20 is connected to rotate a gear 21 meshing with a gear 22. The gear 22 is formed with an internal thread with engages or meshes with a feed screw 23, the lower end of which is fastened to the vertically movable slide 17. By rotating the feed wheel 20, the operator may raise or lower the grinding wheel 15 relative to the table 11 as desired.

Table reciprocating mechanism

The table 11 is arranged so that it may be reciprocated by a suitable power operated mechanism to carry the work beneath the operative face of the grinding wheel 15. In the preferred form, the reciprocating mechanism comprises a fluid pressure system including a cylinder 25 mounted within the base 10. A piston 26 is slidably mounted in the cylinder 25 and is connected by a piston rod 27 to a depending bracket 28 on the under side of the table 11. The base 10 is provided with a fluid reservoir 30 from which fluid is pumped through a pipe 31 by means of a motor driven pump 32. The pump 32 forces fluid under pressure through a pipe to a reversing valve (not shown). The reversing valve is arranged to direct fluid under pressure either through a pipe 35 to a cylinder chamber 36, or through a pipe 37 into a cylinder chamber 38. A table actuated reversing lever 39 is pivotally supported on the front of the machine base and is arranged to be actuated by means of a pair of adjustable table dogs 40 and 41 which are adjustably supported by a T-slot 42 formed in the front edge of the table 11.

A stop and start valve (not shown) is arranged to be actuated by means of a manually operable start and stop lever 45 on the front of the machine base. A speed control valve is provided by a control knob 43 also mounted on the front of the machine base 10. The details of the hydraulic table reciprocating mechanism have not been fully illustrated in the present case since they are not considered to be a part of the present invention. This hydraulic table reciprocating mechanism is identical with that shown in the prior U. S. patent to Carl G. Flygare and Wallace H. Wood, No. 2,022,542, dated November 26, 1935, to which reference may be had for details of disclosure not contained herein.

The grinding wheel 15 and its supporting wheel slide 16 are arranged so that they may be manually adjusted by means of a manually operable hand wheel 44. The actuating mechanism interposed between the hand wheel 44 and the wheel slide 16 is identical with that shown in the prior U. S. Patent No. 2,022,542 above mentioned to which reference may be had for details of this mechanism.

In order to attain the main object of this invention, an oscillatable work supporting mechanism is provided whereby the work piece may be indexed through a partial rotation after each reciprocating movement of the table to present a different portion of the work piece to the grinding wheel whereby a partial cylindrical surface on the work piece may be ground to the desired and predetermined extent. A work supporting fixture 50 is mounted on the upper surface of the table 11. The fixture 50 is provided with a pair of spaced upwardly projecting arms 51 and 52 which serve as a support for an oscillatable work supporting cradle 53. The cradle 53 is provided at its opposite ends with oppositely extending trunnions 54 and 55, respectively. The trunnions 54 and 55 are supported by anti-friction bearings 56 and 57 which are in turn supported in the arms 51 and 52, respectively, of the work supporting fixture 50. The work supporting cradle 53 is provided with a plane work supporting surface 58.

Figure 4:
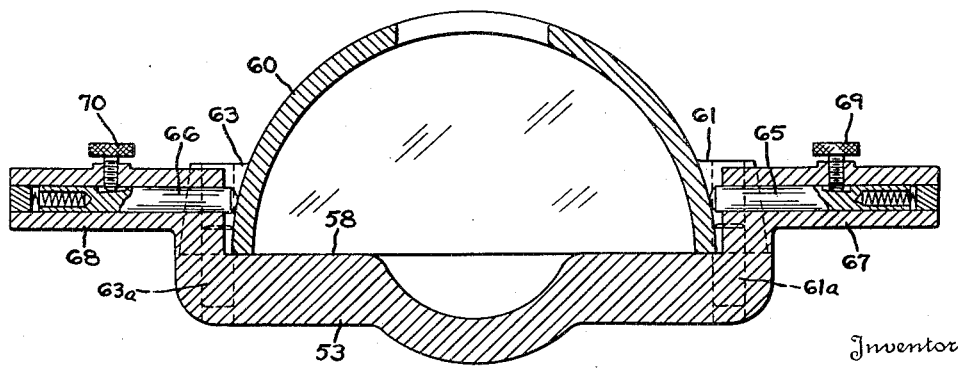
Fig. 4 is a fragmentary cross-sectional view, on an enlarged scale, taken approximately on the line 4—4 of Fig. 2.
Figure 5:
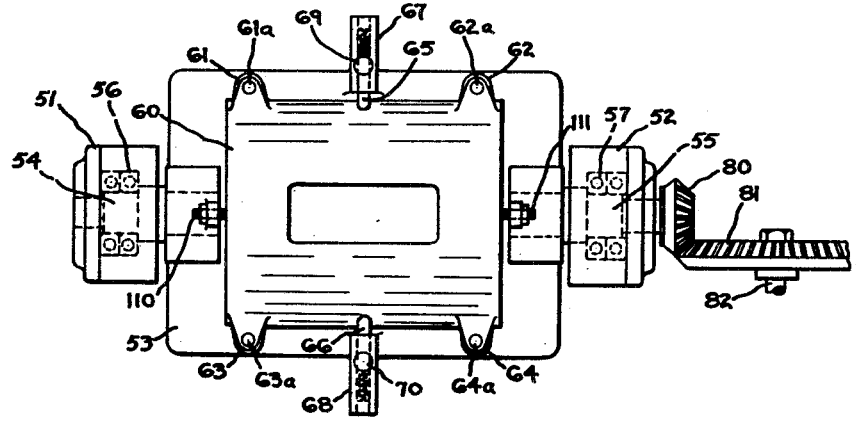
Fig. 5 is a fragmentary plan view, on an enlarged scale, of the work holder and work piece, together with a portion of the indexing mechanism.

A work piece 60 is arranged to be supported on the surface 58. The work piece 60 is provided with four integrally formed projecting lugs 61, 62, 63 and 64 having holes therein which are arranged to mate with a plurality of locating pins or studs 61a, 62a, 63a and 64a fixed on the cradle 53. The work piece 60 is held in position on the work supporting cradle 53 by means of a pair of spring-pressed plungers 65 and 66. The plungers 65 and 66 are supported in projecting bosses 67 and 68 formed integral with the work cradle 53. A pair of binder or clamping screws 69 and 70 are provided for clamping the plungers 65 and 66 in position to prevent lifting of the work piece 60 during a grinding operation. The work piece 60 has a partial cylindrical surface extending between the bosses 61 and 63 (Fig. 4) which is to be ground to the desired and predetermined extent. The grinding operation is accomplished by means of an indexing movement of the work supporting cradle 53 in timed relationship with the longitudinal reciprocatory movement of the work table 11.

A suitable mechanism is provided for rocking the work supporting cradle 53 on its trunnions 54 and 55. This mechanism may comprise a bevelled gear 80 which is mounted on the end of the trunnion 55. The bevel gear 80 meshes with a bevel gear 81 which is keyed to a rotatable shaft 82. The shaft 82 is rotatably journalled in bearings 83 and 84 which are formed integral with a bracket 75. The bracket 75 is in turn fastened to the table 11.

An arm 86 is keyed to the shaft 82 and supports at its outer end a roller or cam follower 87. A cam 88, preferably of a heart-shaped design, is keyed to a rotatable shaft 89. The shaft 89 is journalled in bearings 90 and 91 which are fixedly supported on the table 11. A manually operable hand wheel 92 is mounted on the outer end of the shaft 89, by means of which the shaft 89 may be rotated to rotate the cam 88 which in turn imparts a rocking motion through the cam follower roller 87 and the rock arm 86 to rock the shaft 82. The rotating movement of the shaft 82 transmits a corresponding rotary motion through the bevel gear 81 and the bevel gear 80 to transmit a rotary motion to the work supporting cradle 53. If desired, the hand wheel 92 may be rotated at the end of the reciprocatory stroke of the table to cause a partial rotation of the work piece to present a new portion thereof for the next reciprocatory movement beneath the grinding wheel.

It is desirable, however, to provide an automatically actuated mechanism whereby the work cradle 53 may be indexed through a partial rotation at the end of each reciprocatory movement of the work table 11. This is preferably accomplished by means of a ratchet wheel 95 which is mounted on and keyed to the shaft 89. A pivotally mounted pawl 96 is supported by a bracket 97 which is adjustably clamped to the base 10 by a plurality of clamping screws 98, 99 and 100. The clamping screws 98, 99 and 100 pass through elongated slots formed in the bracket 97 and are screw threaded into the base 10. It will be readily appreciated from the foregoing disclosure that the bracket 97 together with the pawl 96 may be adjusted vertically to position the operative end of the pawl 96 in the desired position relative to the ratchet wheel 95. The ratchet pawl 96 is pivotally supported by a stud 101. An adjustable stop screw 102 serves to limit the rocking movement of the pawl 96 in a clockwise direction. A tension spring 103 is interposed between the pawl 96 and the bracket 97 and serves normally to maintain the pawl 96 in engagement with the stop screw 102.

When the table 11 moves toward its extreme left-hand end position, the pawl 96 engages one of the teeth of the ratchet wheel 95 and continued movement of the table 11 toward the left serves to rotate the ratchet wheel 95 to transmit a partial rotation through the cam and gear mechanism above described to produce a partial rotary motion of the work piece 60.

A holding pawl 105 is pivotally supported on a stud 106 which is in turn supported in fixed relation with the table 11. The pawl 105 is maintained in the position illustrated in Fig. 2 under the influence of gravity and serves to prevent a clockwise movement of the ratchet wheel 95. The holding pawl 105 may be swung in a clockwise direction to an inoperative position, in which position the parts may be readily rotated by rotation of the manually operable hand wheel 92. The ratchet wheel 95 and pawl 96 are arranged so that the ratchet wheel may be readily and manually rotated in a counterclockwise direction during which the pawl 96 swings under the tension of the spring 103.

The grinding operation is preferably started when the work cradle 53 is in broken line position 53a (Fig. 3). In this position of the parts, the work table 11 is reciprocated to traverse the work piece 60 beneath the concave peripheral face of the grinding wheel 15. After one complete reciprocation of the table 11, the ratchet wheel 95 engages the pawl 96 and indexes the cradle 53 in a counterclockwise direction (Fig. 3) through a partial revolution to present a new portion of the work piece to the grinding wheel 15 on the next reciprocation therebeneath. The automatic indexing of the work supporting cradle 53 and work piece 60 continues until the work cradle assumes the broken line position 53b (Fig. 3), in which position the wheel 15 has ground the desired partial cylindrical surface on the work piece 60. A pair of end thrust screws 110 and 111 are provided to engage the end faces of the work piece 60 to aid in holding it against endwise movement on the work cradle 53 during the grinding operation.

A truing tool 112 is mounted on the upper portion of the cradle 53 (Fig. 2). When it is desired to true the periphery of the grinding wheel 15 to a concave shape, the truing tool 112 is raised upwardly so that the cutting point of the truing tool coincides with an element of the surface to be ground. In this position of the parts, the holding pawl 105 is moved to an inoperative position and the cradle 53 oscillated by manual rotation of the hand wheel 92 to oscillate the truing tool 112 in an arcuate path to true the operative peripheral face of the grinding wheel 15 to the desired and predetermined extent. During the truing operation, if desired, the grinding wheel 15 may be adjusted downwardly by manipulation of the vertical feed wheel 20.

The operation of this improved grinding apparatus will be readily appreciated from the foregoing disclosure. A work piece 60 is mounted in position on the work supporting cradle 53 in a manner hereinabove described and the cradle 53 is rocked to position 53a (Fig. 3) by manual rotation of the wheel 92. Assuming the grinding wheel 15 has been previously trued, the reciprocatory movement of the table 11 is started by actuation of the stop and start lever 42 and the work piece 60 together with its support and the table 11 are traversed toward the right through the desired stroke to traverse the work piece beneath the grinding wheel 15 so that a path extending its entire length is ground.

After one complete reciprocation of the table 11, the ratchet wheel 95 engages the pawl 96 and rotates the ratchet wheel in a counterclockwise direction and indexes the work supporting cradle 53 and the work piece 60 so as to present a new portion of the partial cylindrical surface being ground into alignment with the operative face of the grinding wheel 15 before the work piece moves into operative grinding engagement with the wheel 15 on its next reciprocatory stroke. After each succeeding reciprocatory stroke, an indexing movement is imparted to the work cradle 53 and the work piece 60 in a manner above described until the work cradle together with the work piece moves into the broken line position 53b (Fig. 3), in which position the partial cylindrical surface has been ground to the desired extent. The ground work piece may then be removed from the machine and a new work piece inserted thereinstead for the next grinding operation.

The apparatus shown in Figs. 1 and 2 illustrates a work cradle 53 arranged to support one work piece 60. It will be readily appreciated that, if desired, the fixture 50 and the work cradle 53 may be made much longer so as to support a plurality of work pieces 60 in position for a simultaneous grinding operation. In such a case, the work pieces are arranged in alignment on the cradle 53 so that the axes of the partial cylindrical surfaces to be ground coincide. In this position, it will be readily appreciated that two or more work pieces may be readily ground, it being merely necessary to adjust the table dogs 40 and 41 to facilitate a longer grinding path.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinabove set forth or shown in the accompanying drawings is to be interpreted as illustrative and not in a limiting sense.

1. In a grinding machine having a base, a longitudinally reciprocable table, a wheel slide thereon, a rotatable grinding wheel on said slide having a concave operative face and having its axis arranged normal to the reciprocatory movement of said table, means to reciprocate said table, an oscillatable work support pivotally mounted on said table having its axis arranged parallel to the movement of said table, means to support a work piece thereon having a partial cylindrical surface to be ground, and an indexing mechanism for said work support including a cam actuated gear mechanism which is actuated by and in timed relation with the table movement rotarily to index said work piece to index the work piece by an amount substantially equal to the width of the grinding wheel.

2. In a grinding machine having a base, a longitudinally reciprocable table and an adjustable wheel slide, a rotatable grinding wheel on said slide having a concave operative face and having its axis arranged normal to the reciprocatory movement of said table, means to reciprocate said table, a pivotally mounted work support on said table having its axis arranged parallel to said table movement, means to support a work piece thereon having a partial cylindrical surface to be ground, an index mechanism including a cam actuated gear mechanism rotarily to index said work support, and means actuated by and in timed relation with the reciprocatory movement of said table to actuate said indexing mechanism after each complete reciprocation of said table to index the work surface by an amount less than the width of the grinding wheel so as to present a different portion of the work surface to the grinding wheel on each reciprocatory movement thereof so as to grind a predetermined continuous partial cylindrical surface thereon.

3. In a grinding machine having a base, a longitudinally reciprocable table and a vertically and transversely adjustable wheel slide, a rotatable grinding wheel on said slide having a concave operative face and having its axis arranged normal to the reciprocatory movement of said table, means to reciprocate said table, a pivotally mounted work support on said table having its axis arranged parallel to said table movement, means to support a work piece thereon having a partial cylindrical surface to be ground, an index mechanism including gearing rotarily to index said work support, a rotatable cam and a follower to actuate said gearing, and means including a pawl and ratchet mechanism actuated by and in timed relation with the reciprocatory movement of said table to actuate said cam and gear-indexing mechanism after each complete reciprocation of said table so as to present a different portion of the work surface to the grinding wheel on each reciprocatory movement thereof so as to grind a predetermined continuous partial cylindrical surface thereon.

4. In a grinding machine as claimed in claim 1, the combination with the parts and features therein specified, of an indexing mechanism including gearing rotarily to index said work support, means including a cam and a follower to actuate said gearing, a ratchet wheel to rotate said cam, and a pawl adjustably mounted on said base which is arranged to engage and actuate said ratchet wheel after each complete reciprocatory movement of said table to cause a partial rotation of the work support to present a different portion of the work piece to the operative face of the grinding wheel on successive reciprocatory strokes therebetween.

5. In a grinding machine as claimed in claim 1, the combination with the parts and features therein specified, of an indexing mechanism including gearing rotarily to index said work support, a rock arm to rotate said gearing, a follower on said rock arm, a rotatable cam engaged by said follower, and a pawl and ratchet actuated by and in timed relation with said table reciprocation to index said work support incrementally and intermittently.

6. In a grinding machine as claimed in claim 1, the combination with the parts and features therein specified, of an indexing mechanism for said work support including a table-actuated cam-controlled mechanism whereby the work support may be incrementally and intermittently indexed after each complete reciprocation of the table, and a manually operable hand wheel for actuating said indexing mechanism to facilitate a manual adjustment of said work support.

GEORGE T. MUSKOVIN.
JOHN I. GARSIDE.